United States Patent [19]

Ohashi

[11] Patent Number: 5,455,866
[45] Date of Patent: Oct. 3, 1995

[54] ADAPTIVE SEPARATION CONTROL FOR STEREOPHONIC RADIO RECEIVER

[75] Inventor: Toru Ohashi, Saitama, Japan

[73] Assignee: Pioneer Electronic Corporation, Tokyo, Japan

[21] Appl. No.: 89,298

[22] Filed: Jul. 7, 1993

[30] Foreign Application Priority Data

Jul. 10, 1992 [JP] Japan ................... 4-054632 U

[51] Int. Cl.[6] ............................... H04H 5/00
[52] U.S. Cl. ........................................ 381/10
[58] Field of Search ................... 381/10, 11, 13

[56] References Cited

U.S. PATENT DOCUMENTS

| | | |
|---|---|---|
| 3,539,729 | 11/1970 | Von Recklinghausen . |
| 4,198,543 | 4/1980 | Schertz et al. ............... 381/10 |
| 4,356,350 | 10/1982 | Ienaka . |
| 4,620,315 | 10/1986 | Imagawa ...................... 381/10 |
| 4,833,715 | 5/1989 | Sakai ........................... 381/10 |
| 5,027,402 | 6/1991 | Richards, Jr. et al. ......... 381/10 |
| 5,068,896 | 11/1991 | Short ............................ 381/13 |

FOREIGN PATENT DOCUMENTS

| | | |
|---|---|---|
| 2410430C2 | 10/1085 | Germany . |
| 2461134A1 | 7/1975 | Germany . |
| 57-38033 | 3/1982 | Japan ............................ 381/10 |

OTHER PUBLICATIONS

Rosenberg, J. M., *Dictionary of Computers, Information Processing and Telecommunications*, p. 392, 1987.

*Primary Examiner*—Forester W. Isen
*Attorney, Agent, or Firm*—Nikaido, Marmelstein, Murray & Oram

[57] ABSTRACT

A level detector is provided for detecting the level of a signal demodulated by a detector of a stereophonic radio receiver. A separation controller is provided for producing a separation control signal dependent on the detected level. In response to the separation control signal, a stereo decoder controls the separation of left and right channels in such a manner that the separation is increased when the detected level of the demodulated signal is higher than a predetermined level.

2 Claims, 3 Drawing Sheets

5,455,866

ADAPTIVE SEPARATION CONTROL FOR STEREOPHONIC RADIO RECEIVER

BACKGROUND OF THE INVENTION

The present invention relates to a stereophonic radio receiver and more particularly to a receiver wherein a stereophonic reproduction is effectively performed while a sound-to-noise (S/N) ratio is improved.

Due to the straight propagation characteristic of the FM wave, the electric field strength around an FM receiver varies in accordance with a distance from a broadcasting station, geography of the receiving area and dispositions of buildings surrounding the area. In an FM receiver which moves in the varying electric field, such as a car radio, an automatic reception control (ARC) system is provided to change the receiving conditions of the receiver. The ARC system has an automatic separation control system for controlling the separation. Namely, the system controls the degree to which left and right stereo channels are isolated from each other in such a manner that the degree becomes small as the strength of the electric field becomes small. Accordingly, stereophonic sound gradually changes to monophonic sound as the field strength weakens.

A stereo signal is a multiplex signal including frequencies ,in a range between 23 kilohertz and 53 kilohertz arising from a subcarrier. Due to the noises in the above band range, a theoretical S/N ratio is smaller than that of the monophonic broadcast. Namely, as shown in FIG. 2, the S/N ratio of an FM tuner at the stereophonic sound reception is theoretically decreased by 21.7 decibels from that of the monophonic sound reception.

FIG. 3 shows a conventional FM receiver having a separation controller intended to improve the S/N ratio in consideration to the above-described problem.

A stereo broadcast wave is tuned in and converted into an intermediate frequency signal at a front-end 1. The intermediate frequency signal is amplified at an intermediate frequency amplifier 2 and demodulated at an FM detector 3. A stereo decoder 4 demodulates a sum signal (L+R) on a main carrier and a difference signal (L−R) on a subcarrier. The sum signal and the difference signal are added to each other, thereby reproducing right and left channel signals.

An amplified intermediate frequency signal is applied from the amplifier 2 to a level detector 5 where the electric field strength represented by the transmitted stereo signal is detected. The detected electric field strength is applied to a separation controller 6 which produces a separation control signal in accordance with the electric field strength. The separation control signal is applied to the stereo decoder 4 to control the separation of the right and left channel signals.

More particularly, when the electric field strength decreases, a demodulating rate of the subcarrier, which includes noises, is decreased, thereby reducing the difference signal (L−R). When the difference signal is added to the sum signal (L+R) to produce the right and left channel signals, the noise is restrained. Thus, the S/N ratio is improved as an exponential function of a demodulating rate of the subcarrier as shown in FIG. 3.

Hence, in a strong electric field, the modulation rate of the subcarrier is increased, thereby clearly separating the right and left signals. In a weak electric field, the demodulation rate of the subcarrier is reduced, thereby improving the S/N ratio.

However, in the conventional FM receiver, the separation control is not dependent on the level of the signal which decides the S/N ratio, but dependent on the strength of the electric field. Therefore, the separation is unnecessarily reduced in spite of high level of signal. Namely, the stereophonic sound is often changed to the monophonic sound. Therefore, the period of the stereophonic reception is reduced.

SUMMARY OF THE INVENTION

An object of the present invention is to provide an improved demodulating system of an FM receiver where the stereophonic reproduction is realized even in a weak electric field.

According to the present invention, there is provided a stereophonic radio receiver having a detector for demodulating a received signal, comprising a first level detector for detecting the level of a signal demodulated by the detector and for producing a first level signal, separation controller means responsive to the first level signal for producing a first separation control signal, and stereo decoder means responsive to the first separation control signal for controlling the separation of left and right channels.

The separation is controlled so that the separation is increased when the detected level of the demodulated signal is higher than a predetermined level.

In another aspect, the receiver further comprises a second level detector for detecting the strength of the electric field surrounding the receiver and for producing a second level signal.

The separation controller means is further responsive to the second level signal for producing a second separation control signal. In response to the second separation control signal, the stereo decoder means controls the separation of left and right channels in such a manner that the separation is increased when the detected level of the electric field is higher than a predetermined level.

The other objects and features of this invention will become understood from the following description with reference to the accompanying drawings.

DETAILED DESCRIPTION OF THE PREFERRED EMBODIMENTS

Figure 1:
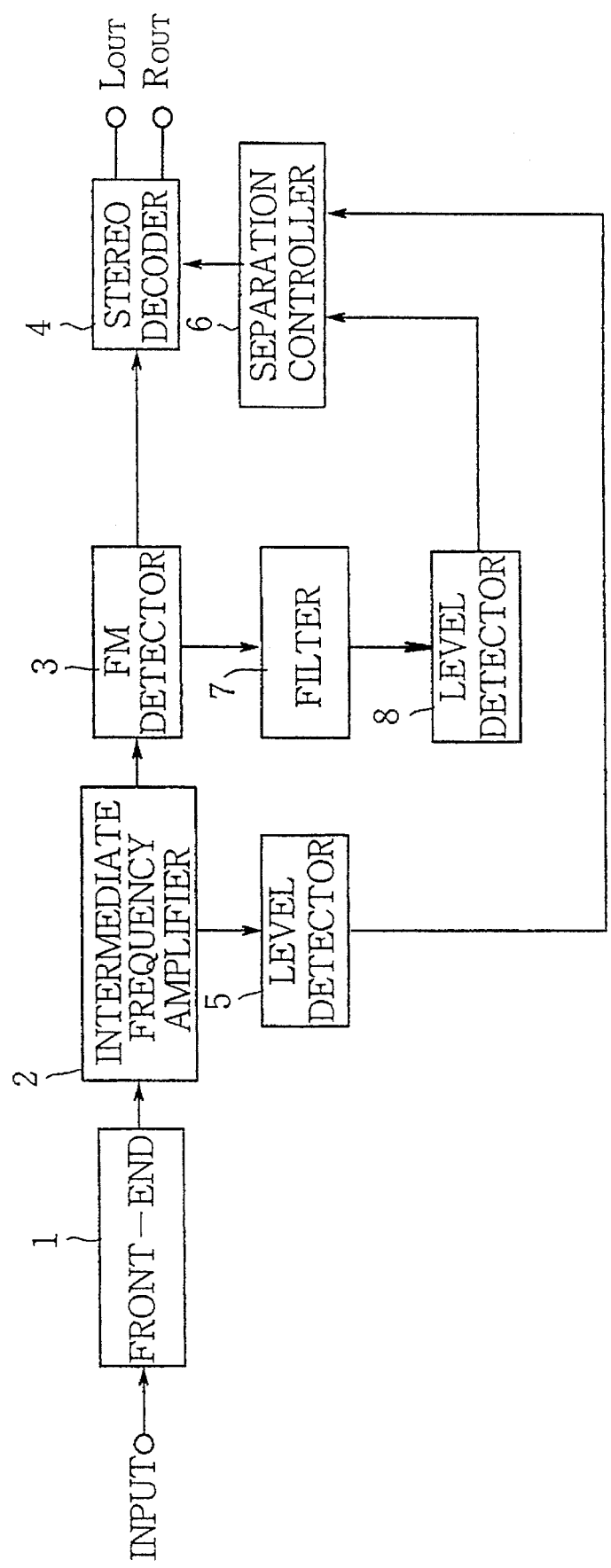
FIG. 1 is a block diagram of a demodulating system of an FM stereophonic radio receiver of the present invention.
Figure 2:
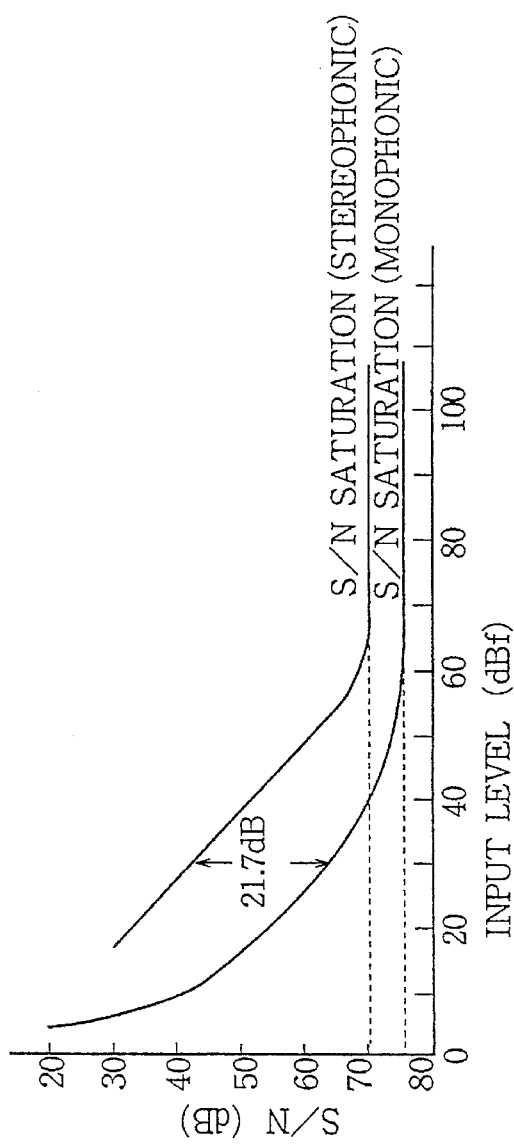
FIG. 2 is a graph showing the relationship between input levels and S/N ratios of a stereophonic signal and a monophonic signal.
Figure 3:
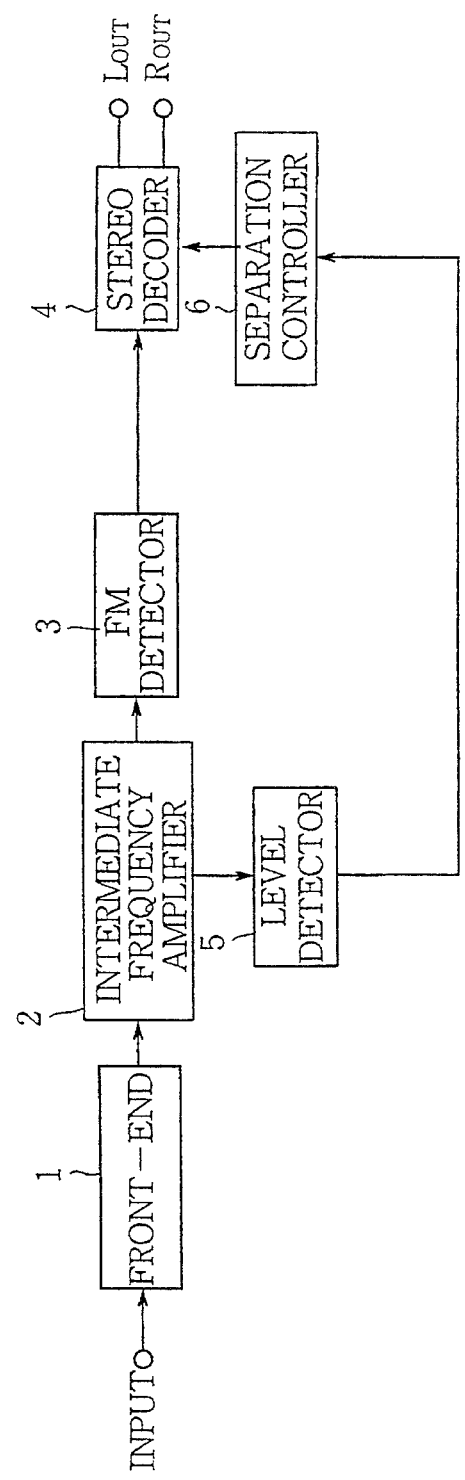
FIG. 3 is a block diagram of a conventional FM streophonic radio receiver.

An FM stereophonic radio receiver according to the present invention is described hereinafter with reference to FIG. 1, wherein the same numerals as those in FIG. 3 designate the same parts as in FIG. 1.

An intermediate frequency signal of a transmitted stereo signal from the front-end 1 is fed to the stereo decoder 4 through the intermediate frequency amplifier 2 and the FM detector 3, so as to be separated into right and left signals R and L. The level detector 5 as a first detector detects the electric field strength represented by the intermediate frequency signal which is fed thereto through the intermediate frequency amplifier 2. The detected electric field strength signal as a first separation control signal is applied to the separation controller 6.

In accordance with the present invention, the receiver is provided with a second level detector 8 which is applied with the demodulated signal from the FM detector 3 through a low-pass filter 7. The second level detector 8 detects the level of the demodulated signal, which is applied to the separation controller 6 as a second separation control signal.

Figure 4:
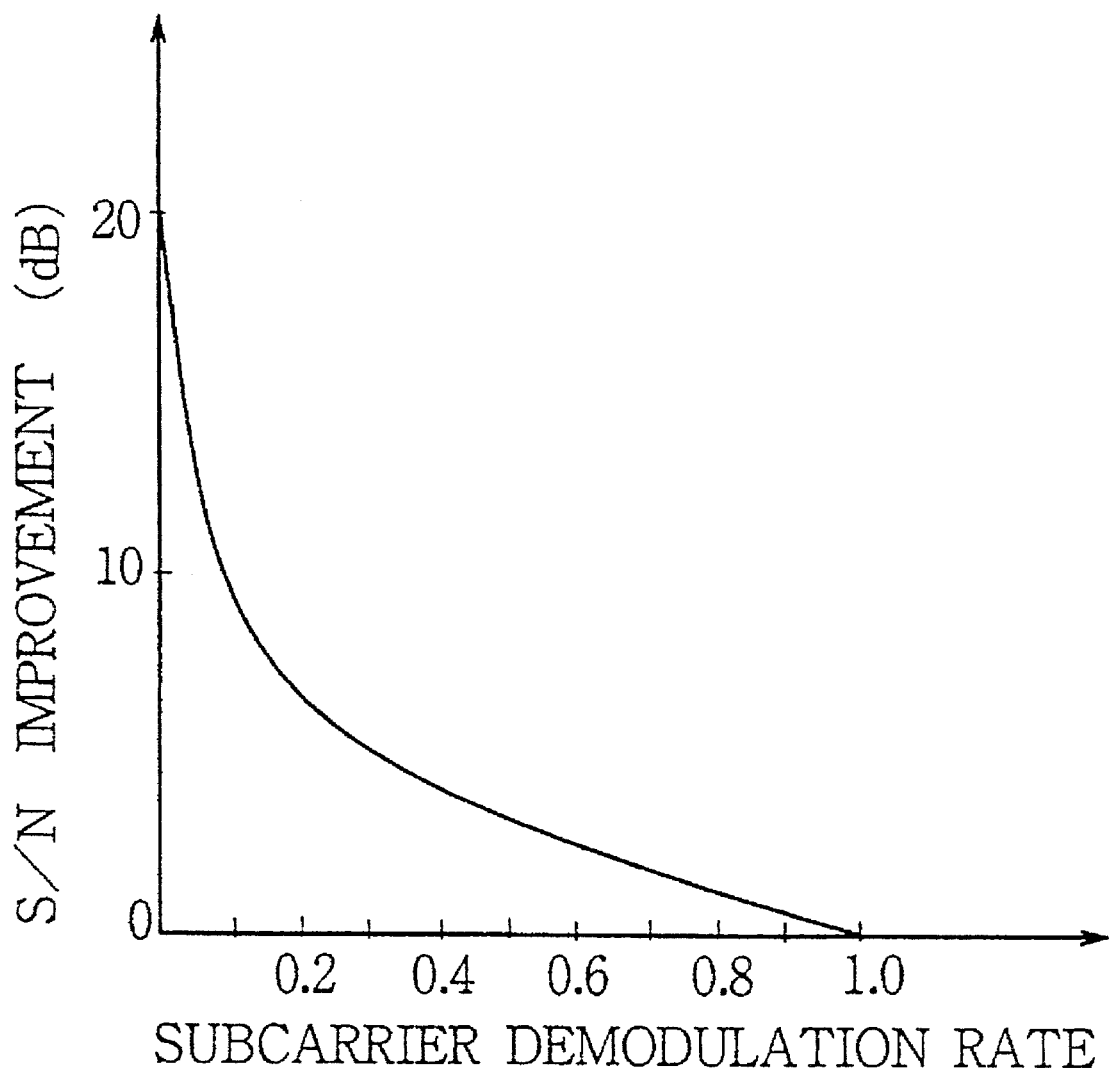
FIG. 4 is a graph showing the relationship between demodulating rate and improved quantities of S/N ratio.

Thus, the separation of the stereo signal at the stereo decoder 4 is controlled in accordance with the electric field strength and with the level of the demodulated signal. When the electric field strength detected by the level detector 5 becomes lower than a predetermined value, the separation controller 6 determines that the separation is to be decreased. If the level of the detected signal detected by the level detector 8 is lower than a predetermined value, the separation is decreased thereby to improve the S/N ratio as shown in FIG. 4. When the level of the detected signal is higher than the predetermined value, the separation is increased, even if the electric field strength is small. Thus, the right and left signals are separated to provide a stereophonic reproduction.

More particularly, the noise as heard by a listener depends on the level of the reproduced sound. Namely, if the reproduced sound is large enough, due to the masking effect, the noise heard is small relative to the reproduced sound. In such a condition, the noise need not be suppressed. Hence, the subcarrier is fully demodulated to realize the stereophonic reproduction.

When the level of the detected signal is low, the same level of noise is heard louder. The signal demodulated from the subcarrier is accordingly suppressed. Hence, although the reproduced sound becomes rather monophonic, the noise is reduced.

Thus in accordance with the present invention, although the field strength may be reduced, the transmitted signals are stereophonically reproduced in a range where the listener is unlikely to notice the noise. As a result, the area where the stereophonic reproduction is realized can be increased.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A stereophonic radio receiver having an intermediate frequency amplifier, an FM detector for demodulating an output signal of the intermediate frequency amplifier, a stereo decoder for separating an output signal of the FM detector to a right channel signal and a left channel signal, said stereophonic radio receiver comprising:

a first level detector provided to receive the output signal of the intermediate frequency amplifier for detecting the strength of the electric field surrounding the receiver and for producing a first level signal;

a second level detector provided for detecting the level of an output signal of the FM detector and for producing a second level signal;

a separation controller responsive to the first and second level signals for producing a separation control signal; and the stereo decoder being provided to respond to the separation control signal for controlling the separation of left and right channels, and arranged such that the separation is increased when the level of the second level signal is higher than a predetermined value.

2. A receiver according to claim 1, further comprising a low-pass filter for filtering the output signal of the FM detector, the second level detector being provided to respond to an output signal of the low-pass filter for producing the second level signal, the stereo decoder is arranged such that the separation is increased when the level of the second level signal is high.

* * * * *